US012649245B2

(12) United States Patent
Cheng et al.

(10) Patent No.: US 12,649,245 B2
(45) Date of Patent: Jun. 9, 2026

(54) QUICK CONNECTION DEVICE, FUNCTIONAL ARM AND ROBOT

(71) Applicant: JINGDONG TECHNOLOGY INFORMATION TECHNOLOGY CO., LTD., Beijing (CN)

(72) Inventors: Erting Cheng, Beijing (CN); Jiuqi Han, Beijing (CN)

(73) Assignee: JINGDONG TECHNOLOGY INFORMATION TECHNOLOGY CO., LTD., Beijing (CN)

( * ) Notice: Subject to any disclaimer, the term of this patent is extended or adjusted under 35 U.S.C. 154(b) by 1087 days.

(21) Appl. No.: 17/770,252

(22) PCT Filed: Aug. 10, 2020

(86) PCT No.: PCT/CN2020/108143
§ 371 (c)(1),
(2) Date: Apr. 19, 2022

(87) PCT Pub. No.: WO2021/077858
PCT Pub. Date: Apr. 29, 2021

(65) Prior Publication Data
US 2022/0266457 A1 Aug. 25, 2022

(30) Foreign Application Priority Data
Oct. 22, 2019 (CN) .......................... 201911003084.3

(51) Int. Cl.
*B25J 15/04* (2006.01)
*B25J 18/00* (2006.01)
(52) U.S. Cl.
CPC ........... *B25J 15/0416* (2013.01); *B25J 18/00* (2013.01)

(58) Field of Classification Search
CPC .... B25J 15/04; B25J 15/0408; B25J 15/0416; B25J 17/00; B25J 17/0241; B25J 18/00;
(Continued)

(56) References Cited

U.S. PATENT DOCUMENTS 4,538,639 A * 9/1985 Inaba .................... B25J 19/0029
251/149.6
4,549,846 A * 10/1985 Torii ........................ B25J 15/04
24/607
(Continued)

FOREIGN PATENT DOCUMENTS

CN       102922534 A    2/2013
CN       105666512 A    6/2016
(Continued)

OTHER PUBLICATIONS

"Communication with Supplementary European Search Report", EP Application No. 20879466.9, Sep. 19, 2023, 5 pp.
(Continued)

*Primary Examiner* — Jonathan P Masinick
(74) *Attorney, Agent, or Firm* — Myers Bigel, P.A.

(57) ABSTRACT

A quick connection device includes: a sleeved connected with a first member and a moving assembly movably disposed in the sleeve. The moving assembly includes: a support base disposed in the sleeve; a mounting base, configured to be connected with a second member and movable along the axial direction relative to the support base; a locking member, fixed to the mounting base and configured to cooperate with the support base to achieve a locking state and an unlocking state and restrict movement of the mounting base towards a direction away from the support base when in the locking state and allow movement of the mounting base towards a direction away from the support base when in the unlocking state; and a limiting member, configured to restrict movement of the moving (Continued)

assembly in the sleeve when the mounting base is in an initial position corresponding to the locking state.

17 Claims, 5 Drawing Sheets

(58) Field of Classification Search
CPC .... F16B 2/16; F16B 7/02; F16B 7/025; F16B 7/04; F16B 7/0106; F16B 7/0413; F16B 7/042; F16B 21/16; F16B 21/165
See application file for complete search history.

(56) References Cited

U.S. PATENT DOCUMENTS

| | | | | |
|---|---|---|---|---|
| 7,559,265 | B2 | 7/2009 | Mizuno | |
| 8,740,494 | B2 * | 6/2014 | Durling | F16B 7/0413 |
| | | | | 403/374.4 |
| 8,747,288 | B2 * | 6/2014 | Strotzer | B25J 19/0029 |
| | | | | 483/1 |
| 8,794,418 | B1 * | 8/2014 | Norton | B25J 17/0208 |
| | | | | 901/29 |
| 9,151,343 | B2 * | 10/2015 | Norton | B25J 17/0233 |
| 9,815,211 | B2 * | 11/2017 | Cao | B25J 19/0029 |
| 10,011,026 | B2 * | 7/2018 | Okada | B25J 17/00 |
| 10,105,855 | B2 * | 10/2018 | Kalb | B25J 17/02 |
| 10,286,566 | B2 * | 5/2019 | Williams | B25J 19/0033 |
| 10,661,449 | B2 * | 5/2020 | Zachary | B23B 31/30 |
| 11,691,294 | B2 * | 7/2023 | Norton | B25J 15/0416 |
| | | | | 483/1 |
| 11,745,359 | B2 * | 9/2023 | Dixon | A61B 17/00 |
| | | | | 403/345 |
| 11,850,733 | B2 * | 12/2023 | Kendrick | B25J 15/0061 |
| 12,090,638 | B2 * | 9/2024 | FitzPatrick | B25J 15/0416 |
| 12,427,585 | B2 * | 9/2025 | Haruna | B25J 15/0047 |
| 2005/0238420 | A1 * | 10/2005 | Hansson | B25J 15/04 |
| | | | | 403/109.3 |
| 2009/0314113 | A1 * | 12/2009 | Wang | B25J 15/04 |
| | | | | 74/148 |
| 2010/0307279 | A1 | 12/2010 | Campagna et al. | |
| 2017/0144230 | A1 * | 5/2017 | Rosso | B23B 31/4046 |
| 2024/0424579 | A1 * | 12/2024 | Takebayashi | B25J 15/0416 |
| 2025/0162174 | A1 * | 5/2025 | Asyraf | B25J 15/0416 |

FOREIGN PATENT DOCUMENTS

| | | | | |
|---|---|---|---|---|
| CN | 205310300 | U | 6/2016 | |
| CN | 206029925 | U | 3/2017 | |
| CN | 106863357 | A | 6/2017 | |
| CN | 206263986 | U | 6/2017 | |
| CN | 206383153 | U | 8/2017 | |
| CN | 207044198 | U | 2/2018 | |
| CN | 207206450 | U | 4/2018 | |
| CN | 207273256 | U | 4/2018 | |
| CN | 108177158 | A | 6/2018 | |
| CN | 109483599 | A | 3/2019 | |
| CN | 110142799 | A | 8/2019 | |
| CN | 110230645 | A | 9/2019 | |
| CN | 110614651 | A | 12/2019 | |
| CN | 211590180 | U | 9/2020 | |
| DE | 10154876 | C1 * | 2/2003 | B23B 31/008 |
| DE | 102017103070 | A1 * | 8/2018 | B25J 15/0416 |
| GB | 2582007 | A * | 9/2020 | F16B 7/0426 |
| JP | 2635112 | B2 * | 7/1997 | B25J 15/04 |
| JP | 2003117869 | A * | 4/2003 | |
| KR | 20090039900 | A * | 4/2009 | E02D 29/12 |
| KR | 20100013353 | A * | 2/2010 | B25J 13/08 |
| WO | 2022037391 | A1 | 2/2022 | |

OTHER PUBLICATIONS

"International Search Report and Written Opinion of the International Searching Authority with English language translation", International Application No. PCT/CN2020/108143, Nov. 16, 2020, 16 pp.

* cited by examiner

QUICK CONNECTION DEVICE, FUNCTIONAL ARM AND ROBOT

CROSS-REFERENCE TO RELATED APPLICATION

The present application is a U.S. National Stage Application under 35 U.S.C. § 371 of International Patent Application No. PCT/CN2020/108143, filed Aug. 10, 2020, which is based on and claims priority to Chinese Patent Application No. 201911003084.3, filed on Oct. 22, 2019, the disclosures of both of which are hereby incorporated to the present disclosure in their entireties.

TECHNICAL FIELD

The present disclosure relates to the technical field of quick connection devices, in particular to a quick connection device, a functional arm and a robot.

BACKGROUND

At present, robots play an important role in the field of industrial automation. A robot has a robot arm having an end effector mounted to the end thereof, and it needs to replace the end effector depending on different functions to be achieved, which will often involve disassembly between the end effector and the robot arm.

In related arts known to the inventor, it is generally that locking between the end effector and the robot arm is performed through fasteners such as screws, however, such a fixing way is inconvenient for quick disassembly by a user, and brings great inconvenience to the using process. Moreover, the end effector cannot rotate relative to the robot arm, and can only be mounted in a fixed position, resulting in failure of adjustment of the mounting position and poor flexibility in use.

SUMMARY

According to a first aspect of the present disclosure, a quick connection device is provided, including a sleeve configured to be connected with a first member to be connected and a moving assembly movably disposed in the sleeve along an axial direction of the sleeve, wherein the sleeve includes:

a support base disposed in the sleeve;

a mounting base, configured to be connected with a second member to be connected and movably disposed along the axial direction relative to the support base;

a locking member, fixed to the mounting base and configured to cooperate with the support base to achieve a locking state and an unlocking state and restrict movement of the mounting base towards a direction away from the support base when in the locking state and allow movement of the mounting base towards a direction away from the support base when in the unlocking state; and a limiting member, configured to restrict movement of the moving assembly in the sleeve when the mounting base is in an initial position corresponding to the locking state, and release limiting when the mounting base moves a preset distance towards the direction away from the support base, in order to allow the moving assembly to move out of the sleeve.

In some embodiments, the moving assembly further includes a travel limiting component, connected to the mounting base, and the travel limiting component is configured to restrict further movement of the mounting base relative to the support base when the mounting base moves a preset distance.

In some embodiments, the support base is provided with a first through hole along the axial direction; one end of the mounting base is inserted into the first through hole; the moving assembly further includes a blocking ring, which is connected to an end of the support base close to an inserted end of the mounting base along the axial direction; the inserted end of the mounting base passes through the blocking ring via the first through hole; and the travel limiting component abuts against the blocking ring when the mounting base moves the preset distance.

In some embodiments, the travel limiting component includes a connecting rod and a limiting portion, a first end of the connecting rod is connected to the inserted end of the mounting base, a second end of the connecting rod is connected with the limiting portion, and a length of the connecting rod is configured in such way that the limiting portion abuts against the blocking ring when the mounting base moves the preset distance.

In some embodiments, the moving assembly further includes a fixed seat and a first fastener, the fixed seat is fixed to the inserted end of the mounting base by the first fastener, the locking member is disposed in the mounting base, and a head of the first fastener protrudes from an end face of the blocking ring;

the travel limiting component includes a limiting ring, the limiting ring is fixed to the mounting base and located at an end of the first fastener away from the mounting base along the axial direction, and a gap is formed between the limiting ring and the blocking ring, and configured in such a way that the limiting ring abuts against the blocking ring when the mounting base moves a preset displacement.

In some embodiments, the blocking ring is embedded in the first through hole, and a side wall of which is provided with an anti-thrust portion configured to restrict the degree of freedom of the movement of the blocking ring towards the mounting base along the axial direction.

In some embodiments, an upper edge of the inner side of the sleeve is provided with a raceway, the limiting member includes a plurality of rolling bodies, the plurality of rolling bodies are configured to be located between the mounting base and the support base and cooperate with the raceway when in the initial position and completely separate from the raceway when the limiting position is released.

In some embodiments, the raceway extends to form a ring shape along a circumferential direction; or the raceway includes a plurality of raceway segments disposed at intervals along the circumferential direction, and each raceway cooperate with at least one rolling body.

In some embodiments, the mounting base is provided with a first guiding surface, configured in such a way that a radial dimension gradually decreases in a direction from the mounting base to the support base, so as to enable the plurality of rolling bodies to move inwards along the radial direction when the mounting base moves in the direction away from the support base.

In some embodiments, the mounting base is provided with a first cooperating surface, the first cooperating surface is connected to the end of the first guiding surface having the largest radial dimension, and the support base is provided with a second cooperating surface;

when in the initial position, an area of the first guiding surface close to the first cooperating surface is configured in such way that the rolling bodies enter the cavity defined by the first cooperating surface, the second cooperating surface and the first guiding surface.

In some embodiments, the mounting base is rotatably disposed relative to the support base, so as to switch the locking member between the locking state and the unlocking state by rotation of the mounting base relative to the support base.

In some embodiments, the blocking ring is provided with a second through hole, which includes:

a first hole segment; and a second hole segment, which has a diameter larger than that of the first hole segment and is located on a side of the first hole segment away from the mounting base along the axial direction, wherein a side wall of the second hole segment is provided with a boss, a top surface of the boss along the radial direction is radially not lower than an inner wall of the first hole segment, and a transition surface is disposed between the boss and the side wall of the second hole segment;

wherein the locking member is configured to lap on a connection surface of the first hole segment and the second hole segment when in the locking state and to move along the transition surface to abut against a top surface of the boss along the radial direction when being switched from the locking state to the unlocking state.

In some embodiments, the top surface of the boss along the radial direction is provided with a groove extending along the axial direction and running-through in an entire axial direction of the second through hole, and a bottom surface of the groove along the radial direction is higher than the inner wall of the first hole segment.

In some embodiments, the moving assembly further includes a fixed seat connected with the mounting base, and the mounting base is provided with a guide slot extending along the radial direction, and the locking member is movably disposed in the guide slot.

In some embodiments, the moving assembly further includes a reset element, disposed between the fixed seat and the locking member and configured to reset the locking member from an unlocking state to a locking state.

In some embodiments, the quick connection device further includes a damping ring disposed in the sleeve at an inserted end of the moving assembly, the damping ring is fixed to the sleeve, and an end face of the inserted end of the moving assembly cooperate with the damping ring by a preset compression force when the locking member is in the locking state.

According to a second aspect of the present disclosure, a functional arm is provided, including the quick connection device of the embodiments mentioned above, the first member to be connected includes an arm portion, and the second member to be connected includes a hand portion.

In some embodiments, the functional arm includes a robot arm or a prosthetic arm.

A third aspect of the embodiments of the present disclosure provides a robot, including the functional arm in the embodiments mentioned above, the functional arm is a robot arm, and the hand portion includes an end effector.

BRIEF DESCRIPTION OF THE DRAWINGS

Drawings illustrated herein are used for providing further understanding of the present disclosure and form part of the present application, and illustrative embodiments of the present disclosure and description thereof are intended for explaining instead of improperly limiting the present disclosure. In the drawings.

DETAILED DESCRIPTION

Figure 1:
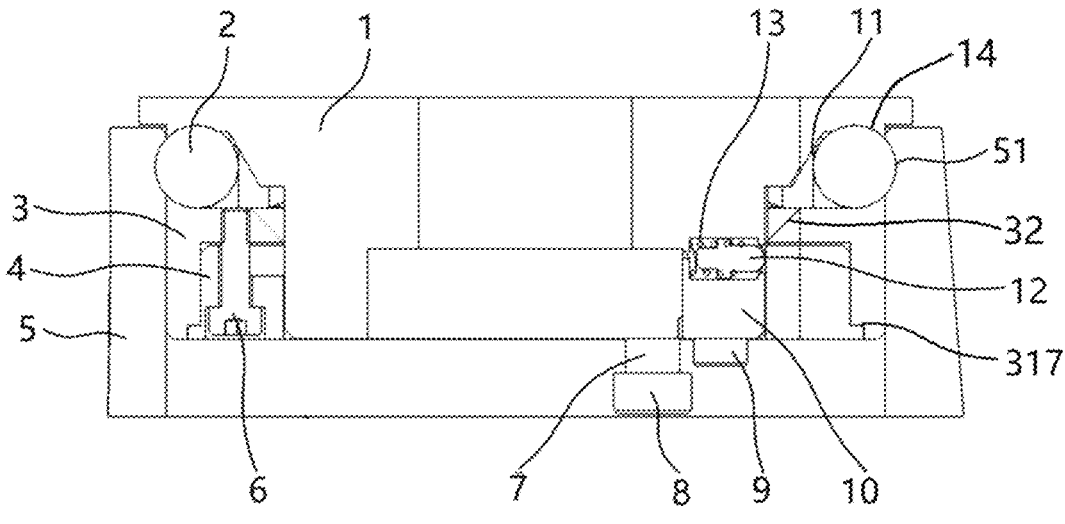
FIG. 1 is a section view of some embodiments of a quick connection device of the present disclosure.

The present disclosure will be illustrated in detail. In the following paragraphs, different aspects of the embodiments are defined in more detail. Various aspects such defined may be combined with any one or more other aspects, unless otherwise stated expressly. In particular, any feature considered to be preferred or advantageous may be combined with one or more other features considered to be preferred or advantageous.

Terms such as "first" and "second" appearing in the present disclosure are merely for the ease of description to distinguish different constituent components, instead of representing a sequential or primary and secondary relationship.

In the description of the present disclosure, the orientation or position relationships indicated by "upper", "lower", "top", "bottom", "front", "back", "inside", "outside" and the like are orientation or position relationships based on what are shown in the drawings, only for the sake of facilitating describing the present disclosure, instead of indicating or implying that the device referred to must have a specific orientation and be configured and manipulated in a specific orientation, and therefore they should not be understood as limitations to the protection scope of the present disclosure. In solid diagrams as shown in FIG. 6 to FIG. 10, in order to show the internal structures of components more clearly, these diagrams are all sectioned along the axial direction, with the section cutting planes being represented by blank areas, but these structures are all intact rotary structures in fact.

Embodiments of the present disclosure provide a quick connection device, a functional arm and a robot, which can realize rapid disassembly and assembly of two components to be connected.

For the quick connection device in some embodiments of the present disclosure, a locking member, when in the locking state, restricts movement of a mounting base towards a direction away from a support base so that a limiting member is in the initial position to restrict movement of a moving assembly in a sleeve, thus the first member to be connected is connected with the second member to be connected; and the locking member, when in the unlocking state, allows movement the mounting base towards the direction away from the support base and releases limiting when the mounting base moves a preset distance towards a direction away from the support base in order to allow the moving assembly to move out of the sleeve, so that the first member to be connected is separated from the second member to be connected. Such connection device can realize quick connection and separation of two members to be connected, is easy to operate, and can improve the disassembly and assembly efficiency.

As shown in FIG. 1 to FIG. 10, in some embodiments, the present disclosure provides a quick connection device, including a sleeve 5 and a moving assembly A. The sleeve 5 is used for connection with the first member to be connected, and the moving assembly A is movably disposed in the sleeve 5 along the axial direction of the sleeve 5. The "axial direction", "radial direction" and "circumferential direction" mentioned herein are all defined based on the sleeve 5.

As shown in FIG. 1, the moving assembly A includes a support base 3, a mounting base 1, a locking member 12 and a limiting member.

Wherein, the support base 3 is located in the sleeve 5, and the mounting base 1 is used for connection with the second member to be connected, and is movably disposed along the axial direction relative to the support base 3.

The locking member 12 is fixed to the mounting base 1, and configured to cooperate with the support base 3 to achieve a locking state and an unlocking state and to restrict movement of the mounting base 1 towards a direction away from the support base 3 when in the locking state and allow movement of the mounting base 1 towards a direction away from the support base 3 when in the unlocking state.

The limiting member is configured to restrict movement of the moving assembly A in the sleeve 5 when the mounting base 1 is in an initial position corresponding to the locking state, so as to realize connection of the first member to be connected and the second member to be connected; and to release limiting when the mounting base 1 moves a preset distance towards the direction away from the support base 3 in order to allow the moving assembly A to move out of the sleeve 5, thus realizing separation of the first member to be connected and the second member to be connected.

The working principle of this embodiment is as follows: the locking member 12, when in the locking state, restricts movement of the mounting base 1 towards a direction away from the support base 3, so that a limiting member is in the initial position to restrict movement of the moving assembly A in the sleeve 5, thus realizing connection of the first member to be connected and the second member to be connected; and the locking member 12, when in the unlocking state, allows movement the mounting base 1 in the direction away from the support base 3 and releases limiting when the mounting base 1 moves a preset distance in a direction away from the support base 3 in order to allow the moving assembly A to move out of the sleeve 5, thus realizing separation of the first member to be connected and the second member to be connected.

Such connection device can realize quick connection and separation of two members to be connected in order to realize detachable connection of the two members to be connected, is easy to operate, can improve the disassembly and assembly efficiency and flexibility in use, and has wide application range. The connection device can be used for the detachable connection of two members to be connected in various fields.

In some embodiments, the connection device is available for a functional arm, the first member to be connected includes an arm portion, the second member to be connected includes a hand portion, and the quick connection device is connected between the arm portion and the hand portion for detachably disposing the hand portion at the wrist end of the arm portion.

Such connection device can realize quick connection and separation of the arm portion and the hand portion in order to realize detachable connection of the hand portion and the arm portion, is easy to operate, and can improve the disassembly and assembly efficiency of the hand portion. Moreover, it is easy to replace hand portions of different types and dimensions according to the needs of use.

For example, the functional arm may be a prosthetic arm for assisting the disabled, and a hand portion of a different dimension can be quickly replaced according to patient's body proportions and life needs, in order to flexibly meet the needs of different patients.

Alternatively, the functional arm may also be a robot arm of a robot for realizing industrial automation by automatically executing functions. The robot arm includes an arm portion and a hand portion. The hand portion may be an end effector, such as a mechanical claw or a suck; and the arm portion can position the end effector to a working position required through movement of multiple DOF (degrees of freedom). According to functions that the robot needs to execute, the end effector can be replaced quickly and conveniently to meet diversified operational needs of the robot arm and improve the versatility of the robot arm.

As shown in FIG. 1, the moving assembly A further includes a travel limiting component, connected to the mounting base 1, and configured to restrict further movement of the mounting base 1 relative to the support base 3 when the mounting base 1 moves outwards a preset distance relative to the sleeve 5, so that the mounting base 1 drives the support base 3 to move outwards together, thereby separating the moving assembly A from the sleeve 5 and in turn realizing separation of the first member to be connected and the second member to be connected. By arrangement of the travel limiting component, it is possible to move the moving assembly A as a whole outwards relative to the sleeve 5 after the limiting member releases the limiting by outward movement of the mounting base 1.

Figure 4:
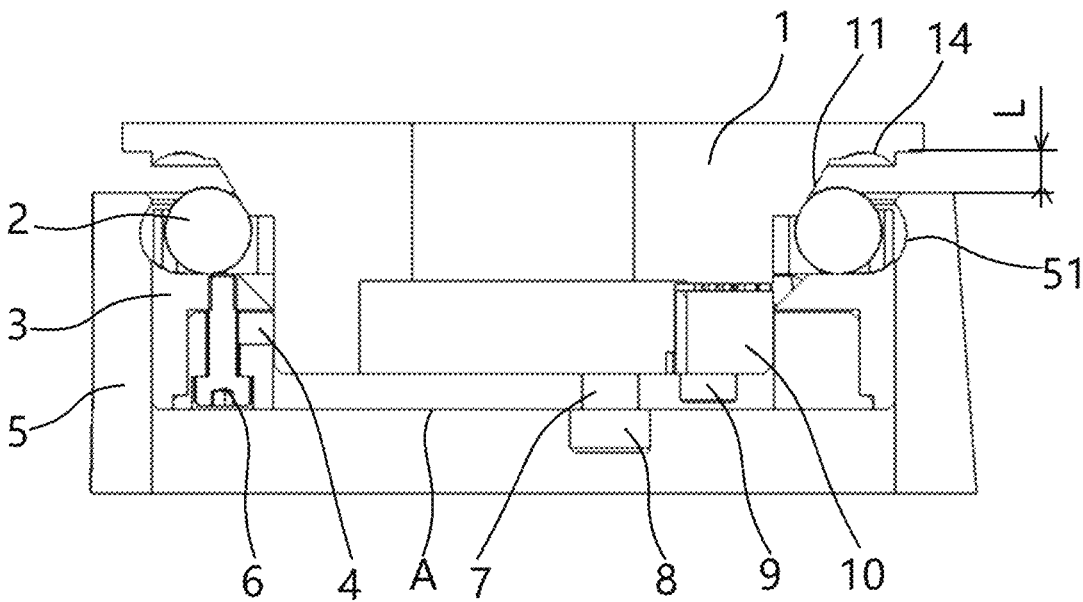
FIG. 4 is a state diagram of moving a mounting base outwards to cause inward movement of rolling bodies along the radial direction in the quick connection device of the present disclosure.

As shown in FIG. 1 and FIG. 4, the support base 3 is provided with a first through hole 31 along the axial direction; one end of the mounting base 1 is inserted into the first through hole 31; the moving assembly A further includes a blocking ring 4, which is connected to the end of the support base 3 close to the inserted end of the mounting base 1 along the axial direction, i.e., connected to the end of the support base 3 close to the first member to be connected along the axial direction; the inserted end of the mounting base 1 passes through the blocking ring 4 via the first through hole 31; and the travel limiting component abuts against the blocking ring 4 when the mounting base 1 moves a preset distance. The inserted end of the mounting base 1 is an end located in the sleeve 5.

As one end of the mounting base 1 needs to pass through the first through hole 31, after the first through hole 31 is disposed on the support base 3, it is easy to enable the travel limiting component to define the moving distance of the mounting base 1 by locally adding the blocking ring 4.

In some embodiments, as shown in FIG. 1, the travel limiting component includes a connecting rod 7 and a limiting portion 8; a first end of the connecting rod 7 is connected to the inserted end of the mounting base 1, i.e., the bottom end in FIG. 1; the limiting portion 8 is connected to a second end of the connecting rod 7; and the length of the connecting rod 7 is configured in such way that the limiting portion 8 abuts against the blocking ring 4 when the mounting base 1 moves the preset distance.

In this embodiment, travel limiting can be performed on the mounting base 1 through a simple and compact structure, with no special limitation to the position relationship of the end face of the inserted end of the mounting base 1 and the end face of the blocking ring 4 away from the end face of the support base 3 along the axial direction, and the preset distance of the mounting base 1 can be defined by the length of the connecting rod 7.

Figure 7:
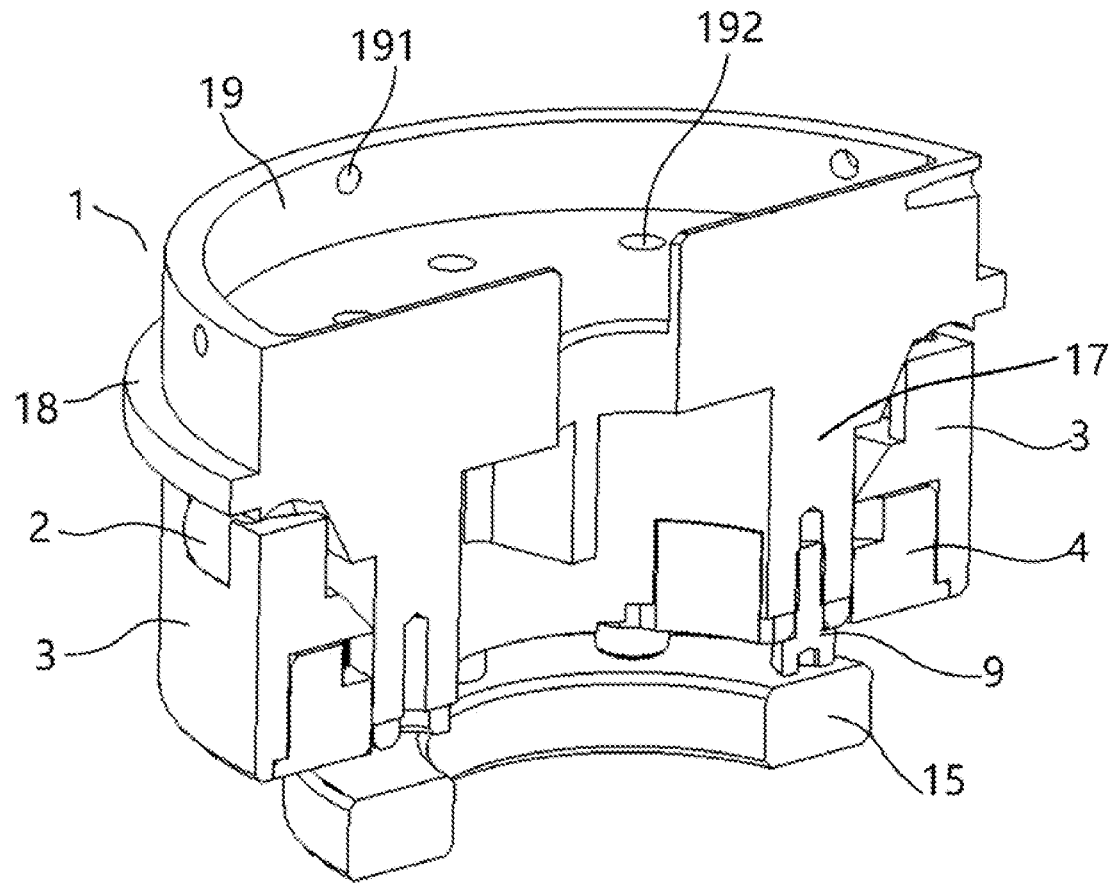
FIG. 7 is a structure diagram of the moving assembly in the quick connection device of the present disclosure from a second perspective.

In other embodiments, as shown in FIG. 7, the moving assembly A further includes a fixed seat 10 and a first fastener 9; the fixed seat 10 is fixed to the inserted end of the mounting base 1 by the first fastener 9; the locking member 12 is disposed in the mounting base 1; and the head of the first fastener 9 protrudes from the end face of the blocking ring 4, for example, the first fastener 9 may employ a blot, a head of which protrudes from the end face of the blocking ring 4 after fixing. One or more first fasteners 9 may be disposed along the circumferential direction. The travel limiting component includes a limiting ring 15, which is fixed to the mounting base 1, and the outer diameter of the limiting ring 15 is larger than the inner diameter of the blocking ring 4.

This structure forms a gap between the blocking ring 4 and the limiting ring 15, this gap is configured in such a way that the limiting ring 15 abuts against the blocking ring 4 when the mounting base 1 moves a preset displacement, and the first fastener 9 protruding from the blocking ring 4 needs to be smaller than the gap in dimension. If the dimension of the gap is larger than that of the first fastener 9, a spacing member may be disposed to ensure the dimension of the gap.

In this embodiment, the bolt may be used to fix the fixed seat 10 to the support base 3, and has higher connection strength than a sunk screw. Moreover, the bottom surface of the limiting ring 15 forms a plane, and is easy to place upright on a horizontal table after the moving assembly A is pulled out as a whole, which facilitates adjustment. For example, when the quick connection device is applied to a functional arm, the moving assembly A together with the hand portion can be vertically placed on the horizontal table, which can prevent damage to the hand portion.

As shown in FIG. 1, the blocking ring 4 is embedded in the first through hole 31, and the side wall of the first through hole 31 is provided with an anti-thrust portion 317, configured to restrict the degree of freedom (DOF) of movement of the blocking ring 4 towards the mounting base 1 along the axial direction. In some embodiments, the end face of the blocking ring 4 may be flush with the end face of the support base 3. For example, the blocking ring 4 may be fixed to the support base 3 by a second fastener 6.

In this embodiment, the blocking ring 4 is embedded in the first through hole 31, which can reduce the axial dimension of the moving assembly A so that the connection device has a more compact structure, and the blocking ring 4 can serve to strengthen the support base 3.

As shown in FIG. 1, the mounting base 1 is rotatably disposed relative to the support base 3, so as to switch the locking member 12 between the locking state and the unlocking state by rotation of the mounting base 1 relative to the support base 3. The upper edge of the inner side of the sleeve 5 is provided with a raceway 51, the limiting member includes a plurality of rolling bodies 2, the plurality of rolling bodies 2 are configured to be located between the mounting base 1 and the support base 3 and cooperate with the raceway 51 when in the initial position and completely separate from the raceway 51 when the limiting position is released.

In this embodiment, the mounting base 1 can rotate relative to the support base 3 through the rolling bodies 2 to realize connection and separation of two members to be connected, which can reduce the friction between the mounting base 1 and the support base 3 during the rotation process; and the separation of the moving assembly A and the sleeve 5 can be restricted through the cooperating of the rolling bodies 2 and the raceway 51 when the locking member 12 is in the locking state, which can make the structure design more compact.

Specifically, the raceway 51 extends along the circumferential direction to form a ring shape; or the raceway 51 includes a plurality of raceway segments disposed at intervals along the circumferential direction, and each raceway cooperates with at least one rolling body 2.

As shown in FIG. 1, the mounting base 1 is provided with a guiding surface 11 configured in such a way that the radial dimension gradually decreases in the direction from the mounting base 1 to the support base 3 to move the rolling bodies 2 inwards along the radial direction when the mounting base 1 moves in a direction away from the support base 3, so as to release limiting to the moving assembly A. For example, the guiding surface 11 may be a conical surface, or in an arc shape on the longitudinal section of the sleeve 5, as long as it is capable of guiding the respective rolling bodies 2 to move inwards along the radial direction.

Figure 6:
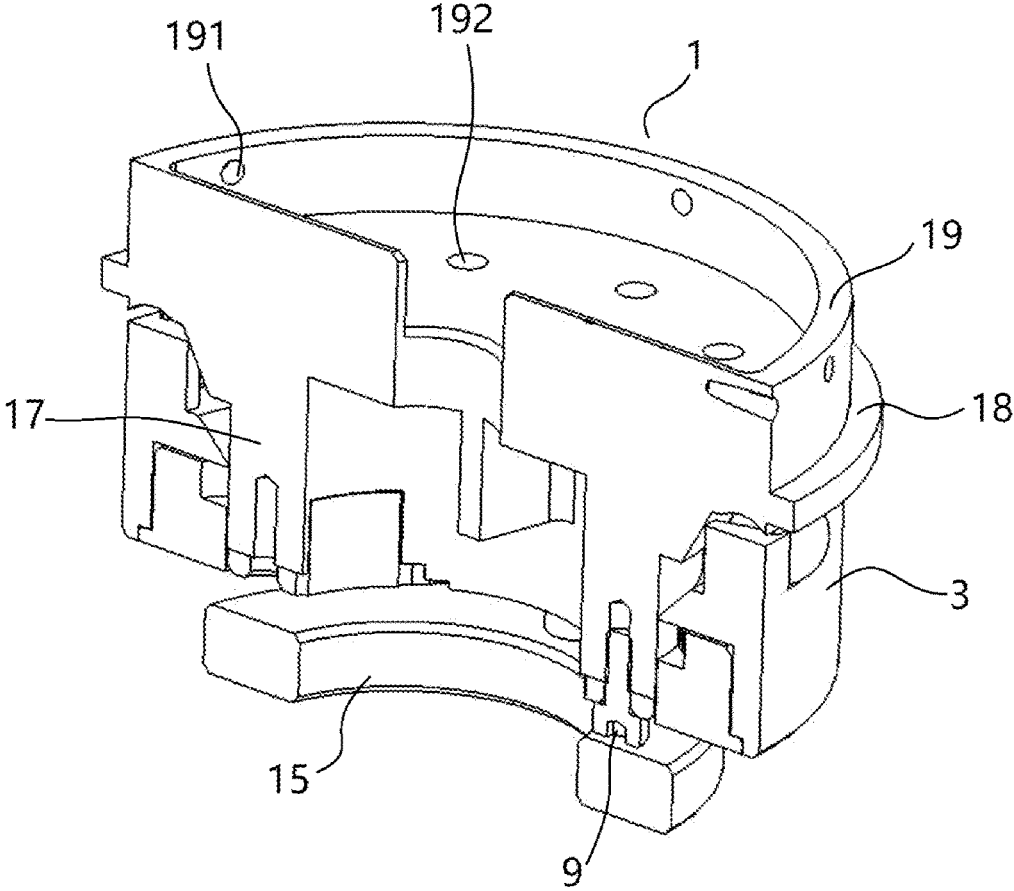
FIG. 6 is a structure diagram of the moving assembly in the quick connection device of the present disclosure from a first perspective.

As shown in FIGS. 6 and 7, the mounting base 1 is a rotary part as a whole, including an extension segment 17, a limiting segment 18 and a connection segment 19 connected in sequence along the axial direction. The extension segment 17 is inserted into the first through hole 31 of the support base 3 and passes through the inner hole of the blocking ring 4. The radial dimension of the outer side wall of the limiting segment 18 is larger than that of the outer side wall of the support base 3, so that the limiting segment 18 abuts against the end face of the sleeve 5 to achieve positioning when it is necessary to connect two members to be connected to insert the moving assembly A as a whole into the sleeve 5. The connection segment 19 is used for connection with the second member to be connected, such as the hand portion.

Figure 9:
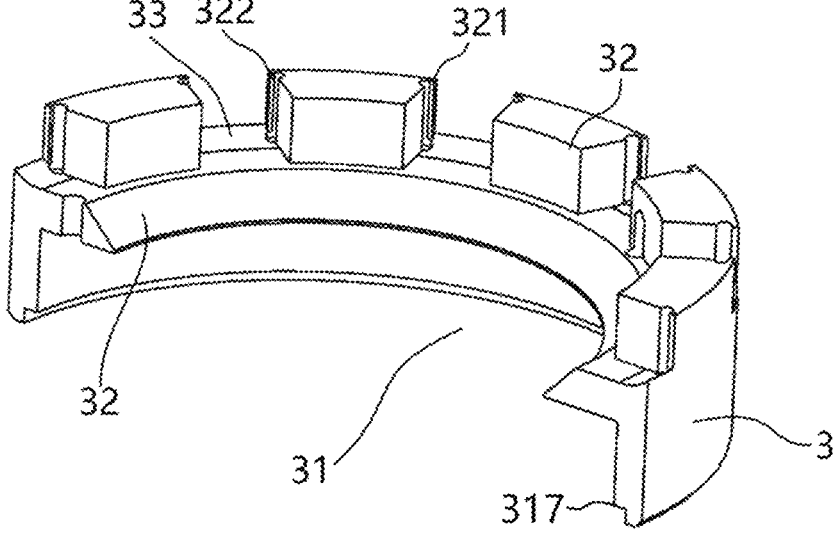
FIG. 9 is a structure diagram of the support base in the quick connection device of the present disclosure.

As shown in FIGS. 1 and 4, the mounting base 1 is provided with a first cooperating surface 14 connected to the end of the guiding surface 11 having the largest radial dimension, and as shown in FIG. 9, the support base 3 is provided with a second cooperating surface 33. In the initial position, the area of the guiding surface 11 close to the first cooperating surface 14 is configured in such way that the rolling body 2 enter the cavity defined by the first cooperating surface 14, the second cooperating surface and the first guiding surface 11. During insertion of the moving assembly A into the sleeve 5, the guiding surface 11 gradually forces the rolling body 2 to move outwards along the radial direction until the rolling bodies 2 are pushed into the raceway 51. The guiding surface 11 may be located at the position where the extension segment 17 and the limiting segment 18 are connected. For example, the first cooperating surface 14 and/or the second cooperating surface 33 are in an arc structure that cooperate with the rolling body 2, or may also be in a plane structure.

As shown in FIG. 9, the end face of the support base 3 close to the mounting base 1 is provided with a plurality of bumps 32, the rolling body 2 is located between two adjacent bumps 32, and the bottom surface of the support base 3 located between the adjacent bumps 32 is provided with the second cooperating surface 33. In order to prevent the rolling body 2 from falling out during the outward movement of the mounting base 1, both sides of the bump 32 along the circumferential direction are each provided with an extension portion 321, which may be located at an outermost position on the bump 32 along the radial direction. Further, in order to facilitate processing of the extension portion 321, a groove 322 may be disposed on the inner side of the extension portion 321 along the radial direction, so as to enable smooth transition of the side face of the bump 32 along the circumferential direction and the extension portion 321 and provide an effective holding space for the rolling body 2.

As shown in FIG. 1, the mounting base 1 is rotatably disposed relative to the support base 3, so as to switch the locking member 12 between the locking state and the unlocking state by rotation of the mounting base 1 relative to the support base 3. Such way is easy to operate to achieve unlocking and does not take up extra space during unlocking, and when this way is applied to a functional arm, the hand portion can be conveniently removed by applying a rotational force thereto.

Figure 3:
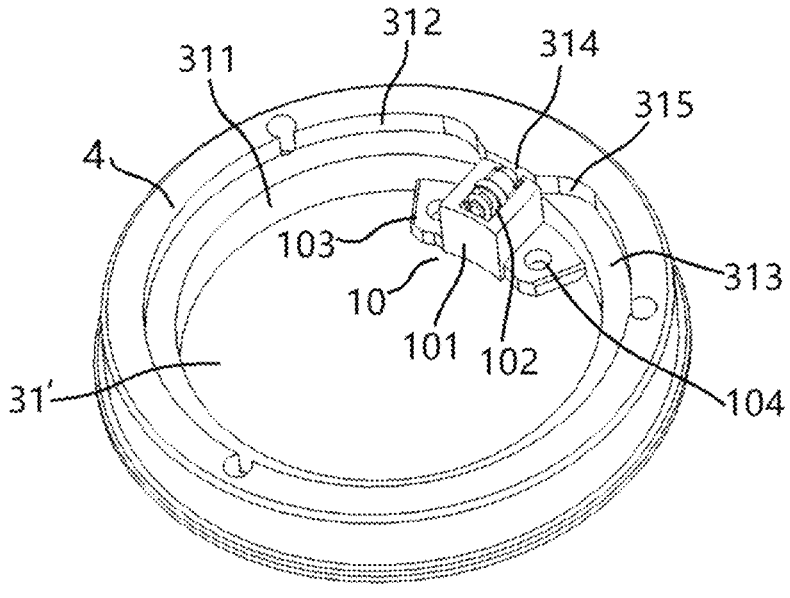
FIG. 3 is a schematic diagram of cooperating of the blocking ring and the locking component in the quick connection device of the present disclosure from a second perspective.

As shown in FIG. 3, the blocking ring 4 is provided with a second through hole 31' along the axial direction. The second through hole 31' includes a first hole segment 311; and a second hole segment 312, which has a diameter larger than that of the first hole segment 311 and is located on a side of the first hole segment 311 away from the mounting base 1 along the axial direction. A side wall of the second hole segment 312 is provided with a boss 314, a top surface of the boss 314 along the radial direction is radially not lower than an inner wall of the first hole segment 311, and a transition surface 315 is disposed between the boss 314 and the side wall of the second hole segment 312, and may be an arc or a slope or the like.

Wherein, the locking member 12 is configured to rotate together with the mounting base 1, lap on the connection surface 313 of the first hole segment 311 and the second hole segment 312 when in the locking state, so as to restrict the outward movement of the mounting base 1 relative to the support base 3, and when being switched from the locking state to the unlocking state, move along the transition surface 315 to abut against the top surface of the boss 314 along the radial direction. As the top surface of the boss 314 along the radial direction is radially not lower than the inner wall of the first hole segment 311, then the mounting base 1 is allowed to move outwards relative to the support base 3. For example, the locking member 12 may be a pin, a slider or a roller or other structure. In order to allow the locking member 12 to reach the boss 314 smoothly, the end of the locking member 13 may be disposed to be in a ball structure.

Such structure can realize unlocking of the locking member 12 by the rotation of the mounting base 1. The structure is simple, so that stagnation of the locking member 12 is not easy to occur in the case of unlocking, and locking and unlocking can be reliably achieved.

As shown in FIG. 3, the side wall of the second hole segment 312 is provided with a boss 314. Optionally, the side wall of the second hole segment 312 is provided with at least two bosses 314, for example, two, three, etc., and the bosses 314 can be evenly distributed along the circumferential direction. Such structure can result in that the mounting base 1 is more stable during unlocking by rotation to prevent the mounting base 1 from tilting, so that the unlocking action is more reliable.

Figure 10:
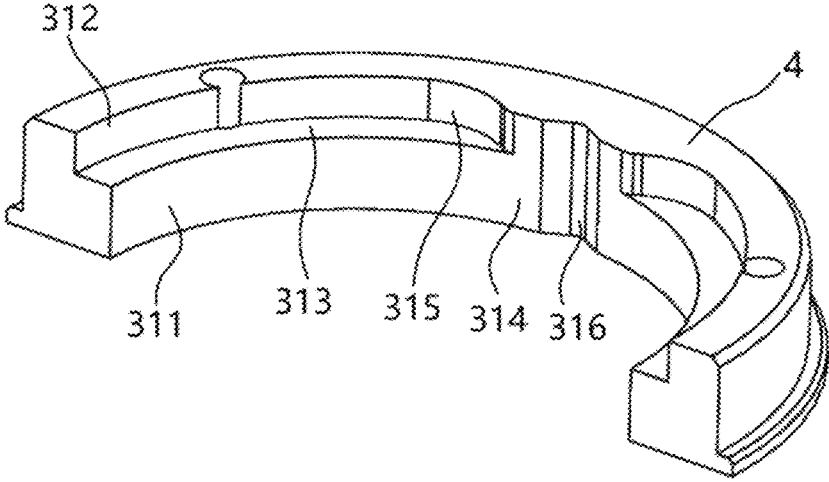
FIG. 10 is a structure diagram of the blocking ring in the quick connection device of the present disclosure.

Further, as shown in FIG. 10, the top surface of the boss 314 along the radial direction is provided with a groove 316, which extends along the axial direction and is running-through in the entire axial direction of the first hole segment 311 and the second hole segment 312, and the bottom surface of the groove 316 along the radial direction is higher than the inner wall of the first hole segment 311. For example, the cross section of the groove 316 may be in an arc shape, or the like, and a transition surface is disposed at the joint of the groove 316 and the boss 314.

In this embodiment, through arrangement of the groove 316, the locking member 12 will quickly fall into the groove 316 when moving onto the boss 314 during unlocking, and can be stably kept in the unlocking state to prevent the locking member 12 from re-entering the locking state when the mounting base 1 is moved outwards. Furthermore, in the process of operating by a user, the locking member 12 may make a sound when entering the unlocking state to fall into the groove 316, so that the user can identify the unlocking state.

Figure 2:
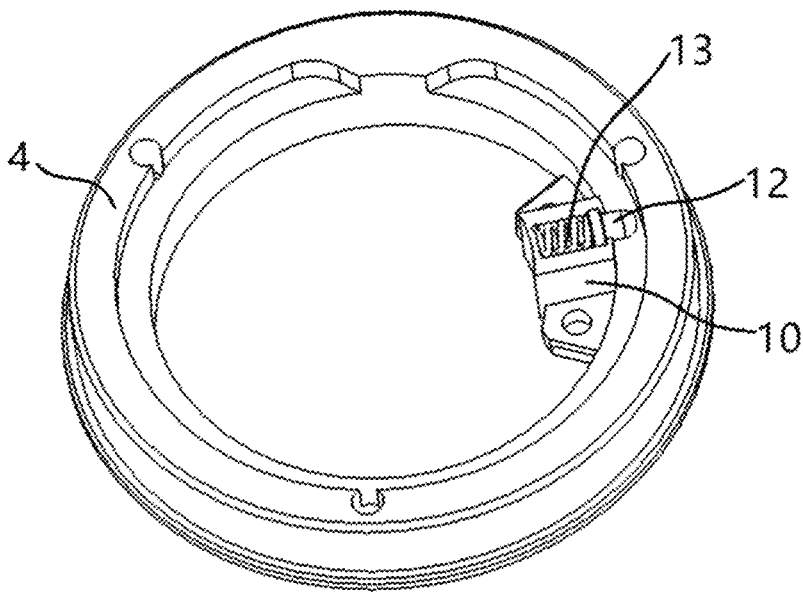
FIG. 2 is a schematic diagram of cooperating of a blocking ring and a locking component in the quick connection device of the present disclosure from a first perspective.

As shown in FIGS. 2 and 3, the moving assembly A further includes a fixed seat 10, which is connected with the mounting base 1 and provided with a guide slot 102 extending along the radial direction, and the locking member 12 is movably disposed in the guide slot 102. Specifically, the fixed seat 10 includes a seat body 101 and a connecting plate 103 disposed on both sides of the seat body 101 along the circumferential direction, the guide slot 102 is disposed on the seat body 101, and the connecting plate 103 is provided with a hole 104 to fix the fixed seat 10 to the area of the mounting base 1 located at the inserted end by the first fastener 9. The number of the fixed seats 10 corresponds to the number of the locking members 12.

Figure 8:
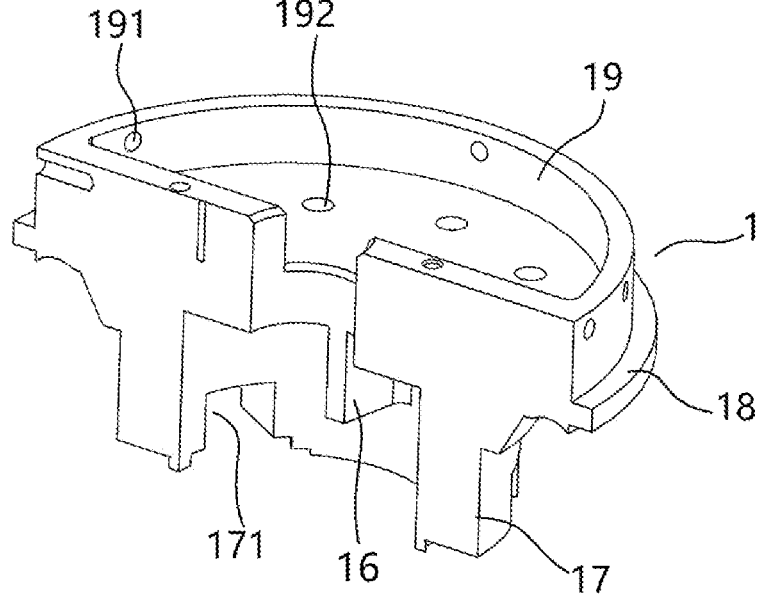
FIG. 8 is a structure diagram of some embodiments of the mounting base in the quick connection device of the present disclosure.

Specifically, as shown in FIG. 8, the extension segment 17 of the mounting base 1 serves as the inserted end; a mounting slot 171 is disposed on the end face of the extension segment 17 away from the connection segment 19 along the axial direction, and is running-through along the radial direction of the extension segment 17; and the fixed seat 10 is located in the mounting slot 171 to enable the locking member 12 to contact the side wall of the second hole segment 312 through the running-through mounting slot 171.

As shown in FIGS. 1 and 9, the side wall of the first hole segment 311 is provided with a second guiding surface 32, the radial dimension of which gradually decreases in the direction that the moving assembly A is inserted into the sleeve 5, for example, the second guiding surface 32 may be a slope, allowing the locking member 12 to be gradually pressed back inwards along the radial direction during insertion of the moving assembly A, so as to axially reach a position where the locking member cooperate with the second aperture segment 312.

Further, as shown in FIG. 8, the mounting base 1 is provided with a hole at the center thereof, and a boss 16 is disposed on the wall of the hole for mounting a circuit board used to control action of the hand portion or for securing a wire.

Further, with reference to FIG. 1, a damping ring is disposed in the sleeve 5 at the inserted end of the moving assembly A; and the damping ring is fixed to the sleeve 5, but is not shown in the figure, and may be disposed at the bottom of the moving assembly A in FIG. 1. When the locking member 12 is in the locking state, a preset compression force is provided between the end face of the inserted end of the moving assembly A and the damping ring, for example, the damping ring is a rigid body, and tightly cooperate with the end face of the inserted end of the moving assembly A; or the damping ring is a resilient member, and has a compression margin with the end face of the inserted end of the moving assembly A. For example, the damping ring may be in contact with the blocking ring 4.

By arrangement of the damping ring, when no external force is applied to the second member to be connected, the second member to be connected is kept to be fixed relative to the first member to be connected, and thus can prevent relative rotation of the two members to be connected; and when an external force is applied to the second member to be connected, the position relationship of the two members to be connected can also be adjusted in the circumferential direction.

When the quick connection device is applied to a functional arm, the hand portion not subjected to an external force remains fixed to the arm portion to prevent the hand portion from rotating relative to the arm portion so that the hand portion can perform actions stably; and when it is necessary to adjust the circumferential position relationship of the hand portion relative to the arm portion, an external force can be applied to the hand portion for adjustment, and the adjustment is convenient and does not affect normal use.

Moreover, when it is necessary to mount the second member to be connected to the first member to be connected, the moving assembly A moves towards the direction of the sleeve 5 as a whole. When it moves to a certain position, the damping ring can stop the movement of the support base 3; continuous application of an external force can cause further movement of the mounting base 1 and various components fixed to the mounting base 1; the locking member 12 slides inwards along the second guiding surface 32; and when sliding to the tail end of the second guiding surface 32, the locking member 12 is pushed out under the action of the reset element 13. The movement of the mounting base 1 stops when the limiting segment 18 contacts the sleeve 5, and then the locking member 12 laps on the connection surface 313. In the process that the mounting base 1 moves relative to the support base 3, the rolling body 2 moves outwards along the axial direction under the action of the first guiding surface 14, and the rolling bodies 2 cooperate with the raceway 51 after the mounting base 1 moves to be in position, so as to realize locking of the two members to be connected.

As shown in FIGS. 1 to 3, the moving assembly A further includes a reset element 13, such as a spring, disposed between the fixed seat 10 and the locking member 12 for resetting the locking member 12 when it is automatically switched from the unlocking state to the locking state. As shown in FIG. 2, the locking member 12 is a hinge pin, on which an anti-thrust platform is disposed; and the spring can be sleeved on the locking member 12, and abuts against the end of the mounting slot 171 away from the support base 3 in the radial direction and the anti-thrust platform.

Second, the present disclosure provides a functional arm, including the quick connection device of the embodiments described above, the first member to be connected includes an arm portion, and the second member to be connected includes a hand portion. For example, the functional arm includes a robot arm or a prosthetic arm.

As shown in FIGS. 6 to 8, the hand portion includes a wrist portion and a hand back portion, the connection segment 19 of the mounting base 1 is of a cylindrical structure, a first hole 191 is disposed on the side wall of the connection segment 19, and the hand back portion is affixed to the outside of the connection segment 19 to fix the hand back portion to the side wall of the connection segment 19 by a third fastener. The bottom of the connection segment 19 is partially sealed, and a second hole 192 is formed in the sealed portion, and the wrist portion is inserted into the connection segment 19 and fixed to the inner bottom of the connection segment 19 by a fourth fastener. Such connection structure can more firmly fix the hand portion to the mounting base 1.

The working principle of the functional arm of the present disclosure is described below:

When it is necessary to pull out the hand portion from the arm portion, as in FIGS. 2 and 4, an external force is applied to rotate the mounting base 1, and when the locking member 12 rotates along with mounting base to the position of the boss 314 through the transition surface 315 along the connection surface 313, the locking member 12 overcomes the acting force of the reset element 13 to move inwards along the radial direction. Then, an outward acting force is applied to the mounting base 1 along the axial direction to move it outwards, and each rolling body 2 moves inwards under the lateral force of the raceway 51 during the movement.

Figure 5:
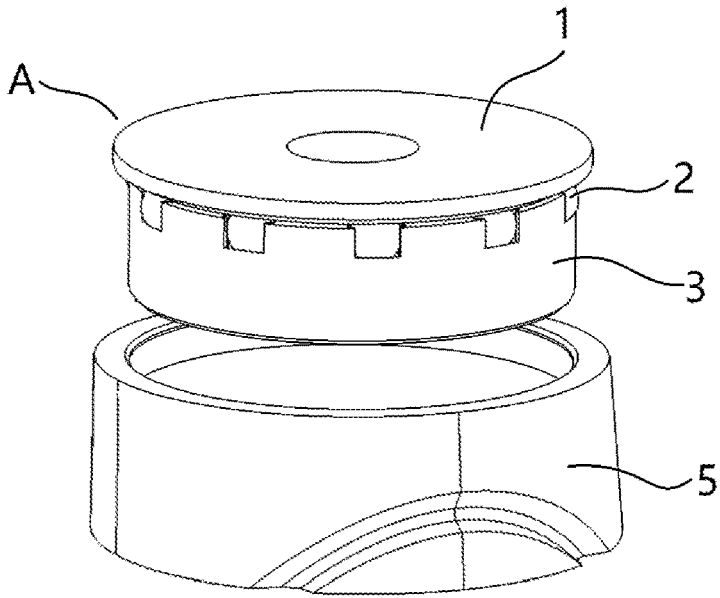
FIG. 5 is state diagram that a moving assembly wholly separates from a sleeve.

As shown in FIGS. 1 and 4, when the mounting base 1 moves a preset displacement L outwards relative to the sleeve 5, each rolling body 2 completely separates from the raceway 51 and is in a limiting released state, and then the limiting portion 8 is butt jointed with the bottom of the blocking ring 4. Next, further outward movement of the mounting base 1 will drive the support base 3 to move, so that the entire moving assembly A moves outwards to separate the moving assembly A from the sleeve 5, as shown in FIG. 5, then the hand portion is quickly separated from the arm portion.

When it is necessary to mount the hand portion to the arm portion, the moving assembly A moves towards the direction of the sleeve 5 as a whole, for example, moves downwards in FIG. 1. When it moves to a certain position, the support base 3 stops movement due to limiting of the damping ring; continuous application of an external force can cause further movement of the mounting base 1 and various components fixed to the mounting base 1; the locking member 12 slides inwards along the second guiding surface 32; and when sliding to the tail end of the second guiding surface 32, the locking member 12 is pushed out under the action of the reset element 13. The movement of the mounting base 1 stops when the limiting segment 18 contacts the sleeve 5, and then the locking member 12 laps on the connection surface 313. In the process of moving the mounting base 1 relative to the support base 3, the rolling bodies 2 move outwards along the radial direction under the action of the first guiding surface 14, and the rolling bodies 2 cooperate with the raceway 51 after the mounting base 1 moves to be in position, so as to realize locking of the hand portion.

Third, the present disclosure further provides a robot, including the functional arm of the embodiments mentioned above, the functional arm is a robot arm, and the hand portion includes an end effector. The robot arm is used for realizing industrial automation through automatically executing required functions. The robot arm includes an arm portion and a hand portion. The hand portion may be an end effector, such as a mechanical claw or a suck; and the arm portion can position the end effector to a working position required through movement of multiple degrees of freedom. According to functions that the robot needs to execute, the end effector can be replaced quickly and conveniently to meet diversified operational needs of the robot arm and improve the versatility of the robot arm.

The embodiments mentioned above introduce the quick connection device, the functional arm and the robot provided by the present disclosure in detail. The principle and implementations of the present disclosure are set forth herein by using specific embodiments, and illustration of the above embodiments is merely for helping understanding of the method of the present disclosure and the core concept thereof. It should be noted that various improvements and modifications may also be made to the present disclosure for a person of ordinary skill in the art without departing from the principle of the present disclosure, and these improvements and modifications also fall into the protection scope of claims of the present disclosure.

The invention claimed is:

1. A quick connection device, comprising a sleeve configured to be connected with a first member to be connected and a moving assembly movably disposed in the sleeve along an axial direction of the sleeve, wherein the moving assembly comprises:

a support base disposed in the sleeve;

a mounting base, configured to be connected with a second member to be connected and movably disposed along the axial direction relative to the support base;

a locking member, fixed to the mounting base and configured to cooperate with the support base to achieve a locking state and an unlocking state, and to restrict movement of the mounting base towards a direction away from the support base in the locking state and allow movement of the mounting base towards a direction away from the support base in the unlocking state;

a limiting member, configured to restrict movement of the moving assembly in the sleeve when the mounting base is in an initial position corresponding to the locking state, and release limiting when the mounting base moves a preset distance towards the direction away from the support base, in order to allow the moving assembly to move out of the sleeve; and a travel limiting component, connected to the mounting base, and the travel limiting component is configured to restrict further movement of the mounting base relative to the support base when the mounting base moves a preset distance.

2. The quick connection device according to claim 1, wherein the support base is provided with a first through hole along the axial direction; one end of the mounting base is inserted into the through hole; the moving assembly further comprises a blocking ring, which is connected to an end of the support base close to an inserted end of the mounting base along the axial direction; the inserted end of the mounting base passes through the blocking ring via the first through hole; and the travel limiting component abuts against the blocking ring when the mounting base moves the preset distance.

3. The quick connection device according to claim 2, wherein the travel limiting component comprises a connecting rod and a limiting portion, a first end of the connecting rod is connected to the inserted end of the mounting base, a second end of the connecting rod is connected with the limiting portion, and a length of the connecting rod is configured in such way that the limiting portion abuts against the blocking ring when the mounting base moves the preset distance.

4. The quick connection device according to claim 2, wherein the moving assembly further comprises a fixed seat and a first fastener, the fixed seat is fixed to the inserted end of the mounting base by the first fastener, the locking member is disposed in the mounting base, and a head of the first fastener protrudes from an end face of the blocking ring;

the travel limiting component comprises a limiting ring, the limiting ring is fixed to the mounting base and located at an end of the first fastener away from the mounting base along the axial direction, and a gap is formed between the limiting ring and the blocking ring, and configured in such a way that the limiting ring abuts against the blocking ring when the mounting base moves a preset displacement.

5. The quick connection device according to claim 2, wherein the blocking ring is embedded in the first through hole, and a side wall of the through hole is provided with an anti-thrust portion, which is configured to restrict the degree of freedom of movement of the blocking ring towards the mounting base along the axial direction.

6. The quick connection device according to claim 1, wherein an upper edge of an inner side of the sleeve is provided with a raceway, the limiting member comprises a plurality of rolling bodies, the plurality of rolling bodies are configured to be located between the mounting base and the support base and cooperate with the raceway when in the initial position, and completely separate from the raceway when the limiting position is released.

7. The quick connection device according to claim 6, wherein the raceway extends along a circumferential direction to form a ring shape; or the raceway comprises a plurality of raceway segments disposed at intervals along the circumferential direction, and each raceway cooperates with at least one rolling body.

8. The quick connection device according to claim 6, wherein the mounting base is provided with a first guiding surface, configured in such a way that a radial dimension gradually decreases in a direction from the mounting base to the support base, so as to enable the plurality of rolling bodies to move inwards along the radial direction when the mounting base moves in the direction away from the support base.

9. The quick connection device according to claim 8, wherein the mounting base is provided with a first cooperating surface, the first cooperating surface is connected to an end of the first guiding surface having the largest radial dimension, and the support base is provided with a second cooperating surface;

in the initial position, an area of the first guiding surface close to the first cooperating surface is configured in such way that the rolling bodies enter the cavity defined by the first cooperating surface, the second cooperating surface and the first guiding surface.

10. The quick connection device according to claim 1, wherein the mounting base is rotatably disposed relative to the support base, so as to switch the locking member between the locking state and the unlocking state by rotation of the mounting base relative to the support base.

11. The quick connection device according to claim 1, wherein the blocking ring is provided with a second through hole along the axial direction, the second through hole comprises:

a first hole segment; and a second hole segment, which has a diameter larger than that of the first hole segment and is located on a side of the first hole segment away from the mounting base along the axial direction, wherein a side wall of the second hole segment is provided with a boss, a top surface of the boss along the radial direction is radially not lower than an inner wall of the first hole segment, and a transition surface is disposed between the boss and the side wall of the second hole segment;

wherein the locking member is configured to lap on a connection surface of the first hole segment and the second hole segment when in the locking state, and to move along the transition surface to abut against the top surface of the boss along the radial direction when being switched from the locking state to the unlocking state.

12. The quick connection device according to claim 11, wherein the top surface of the boss along the radial direction is provided with a groove, which extends along the axial direction and is running-through in an entire axial direction of the second through hole, and a bottom surface of the groove along the radial direction is higher than the inner wall of the first hole segment.

13. The quick connection device according to claim 11, wherein the moving assembly further comprises a fixed seat, which is connected with the mounting base, and the fixed seat is provided with a guide slot extending along the radial direction, and the locking member is movably disposed in the guide slot.

14. The quick connection device according to claim 13, wherein the moving assembly further comprises a reset element, disposed between the fixed seat and the locking member and configured to reset the locking member from an unlocking state to a locking state.

15. A functional arm, comprising the quick connection device according to claim 1, wherein the first member to be connected comprises an arm portion, and the second member to be connected comprises a hand portion.

16. The functional arm according to claim 15, wherein the functional arm comprises a robot arm or a prosthetic arm.

17. A robot, comprising the functional arm of claim 15, wherein the functional arm is a robot arm, and the hand portion comprises an end effector.

\* \* \* \* \*